3,211,611
ANTICOCCIDIAL COMPOSITIONS AND METHODS OF USING SAME
Robert L. Clark, Woodbridge, and Edward F. Rogers, Middletown, N.J., assignors to Merck & Co., Inc., Rahway, N.J., a corporation of New Jersey
No Drawing. Filed Nov. 1, 1962, Ser. No. 234,842
9 Claims. (Cl. 167—53.1)

This invention relates to compositions and methods for treating and preventing a parasitic disease of animals. More specifically, it relates to feed compositions useful against the poultry disease coccidiosis. Still more particularly, it is concerned with the treatment and prevention of coccidiosis with certain 4-nitro benzoic acid compounds, and with poultry feeds and feed supplements containing such substances as active anticoccidial agents.

Coccidiosis is a common and widespread poultry disease caused by species of protozoan parasites of the genus Eimeria. The more important of these species are *E. maxima, E. acervulina, E. tenella, E. necatrix, E. brunetti, E. praecox* and *E. mitis*. In turkeys, *E. meliadigris* and *E. adenoides* are also causative organisms of coccidiosis. When left untreated, the severe forms of the disease lead to poor weight gain, reduced feed efficiency and high mortality. For these reasons, the successful control of coccidiosis is highly important to the poultry industry.

Many of the coccidiostats heretofore available have been primarily effective against the *E. tenella* and *E. necatrix* species, although they also have varying degrees of activity against other species such as *E. maxima, E. acervulina* and *E. brunetti*. We have now discovered a class of compounds that are primarily effective and useful in the treatment and prevention of coccidiosis due to this latter group of species. One object of the present invention, therefore, is to provide a new and important method of controlling coccidiosis. A further object is a method of controlling *E. maxima, E. acervulina* and *E. brunetti* coccidial infections. Another object is to provide poultry feeds containing as an anticoccidial agent one of the compounds described herein. A still further object is the provision of poultry feed supplement compositions containing such an anticoccidial agent. Other objects of the invention will become clear from the following detailed description of the invention.

According to the present invention it has now been found that 4-nitro benzoic acid compounds of the formula

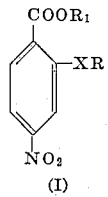

(I)

have an unexpectedly high degree of anticoccidial activity, particularly against *E. maxima, E. acervulina* and *E. brunetti*. In the above formula, X represents oxygen or sulfur, R represents a lower alkyl or lower alkenyl radical, and $R_1$ represents hydrogen, a hydrocarbon radical having less than 8 carbon atoms such as a lower alkyl group, or a metal. Thus, R may be a lower alkyl group such as methyl, ethyl, propyl, butyl or isopropyl, or it may be lower alkenyl of the type exemplified by allyl or methallyl groups. When $R_1$ is lower alkyl it may be one of the above-mentioned alkyl radicals, although R and $R_1$ need not be the same when both are lower alkyl in any given compound. $R_1$ in the compounds of Formula I above may also be a metal, and particularly an alkali or alkaline earth metal such as sodium, potassium, calcium or magnesium; it may also be a heavy metal such as zinc, bismuth, copper, lead and the like.

In accordance with our invention, these 4-nitro benzoic acid compounds are employed for preventing and controlling coccidiosis by administering them to poultry susceptible to or infected with coccidiosis, either in the drinking water or in the feed of the birds. It is necessary to feed only very minor amounts of the 4-nitro benzoic acid compound to the poultry since these substances possess a very high degree of anticoccidial activity.

The amount of 4-nitro benzoic acid compound required for optimal results in treating or preventing coccidiosis will, of course, vary to some extent depending upon the type and severity of the coccidial infection and the particular compound to be used. Generally, the anticoccidial compounds of this invention are administered to poultry in the feed at concentrations of about 0.0005% to 0.0125% by weight of the feedstuff, and drug concentrations of 0.001% to 0.01% by weight of feed are normally very satisfactory. In some instances, it may be desirable to employ levels of up to about 0.05% by weight of the feed although these higher dosages are not generally used for prophylactic treatment where the medicated feed is given continuously to the poultry but are of value in treating an established outbreak of coccidiosis. It will be appreciated by those skilled in this art that the lowest levels consonant with fully adequate control of coccidiosis and the development of immunity will be employed in most instances in order to eliminate as far as possible any risk of side effects that might be induced on prolonged feeding of unnecessarily high levels of these coccidiostats. The finished feed in which the above-discussed levels of coccidiostat are employed is a nutritionally adequate one containing sources of carbohydrate, protein, fat, vitamins, minerals and other nutritional factors commonly employed in commercial poultry raising.

In addition to administration via the solid feedstuff, the 4-nitro benzoic acid compounds of the invention may be administered to poultry by way of the drinking water. The preferred dose levels in the drinking water are usually somewhat less than those employed in a solid feed inasmuch as poultry drink about twice as much as they eat. Administration of these anticoccidial substances via the drinking water is of advantage when using the compounds therapeutically. It is convenient to prepare dispersible or water-soluble powders in which the coccidiostat is intimately dispersed in a suitable carrier such as dextrose or sucrose at concentrations of from about 0.3% to about 25% by weight. These solids may then be conveniently added to the drinking water by the poultry grower.

According to a further aspect of this invention there are provided compositions comprising poultry feed supplements or additives containing a 4-nitro benzoic acid compound of Formula I above as an active anticoccidial ingredient. In these compositions the anticocidial compound is mixed with or dispersed in an orally ingestible carrier vehicle that is non-toxic to the poultry and compatible with the finished feedstuff.

These feed supplements, which contain a significantly higher percentage of coccidiostat than does the finished feed, are mixed with or blended into the feedstuff. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 0.25% to about 30% by weight of drug. Poultry feed additives containing from about 1 to 30%, and particularly from about 2 to 20%, by weight of a 4-nitro benzoic acid compound of this invention are highly suitable. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.5% to about 15% by weight of active ingredient are preferred.

Examples of diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefited thereby.

Typical feed supplements containing a 4-nitro benzoic acid compound of Formula I above are the following:

(A)

| | Lbs. |
|---|---|
| 2-ethoxy-4-nitro benzoic acid | 2.5 |
| Corn germ meal | 45.0 |
| Corn distillers' grains | 52.5 |

(B)

| | |
|---|---|
| Methyl 2-ethylthio-4-nitro benzoate | 5.0 |
| Wheat middlings | 50.0 |
| Soybean meal | 45.0 |

(C)

| | |
|---|---|
| 2-allyloxy-4-nitro benzoic acid | 10.0 |
| Corn distillers' dried grains | 90.0 |

(D)

| | |
|---|---|
| Ethyl 2-ethoxy-4-nitro benzoate | 2.0 |
| Amprolium | 25.0 |
| Corn gluten feed | 73.0 |

The 4-nitro benzoic acid compounds, which have been found to be highly active coccidiostat compounds in accordance with this invention, may be employed as the sole coccidiostat being administered to poultry. However, since these substances are primarily effective against the *E. maxima*, *E. acervulina* and *E. brunetti* species of coccidia and are less effective than many other coccidiostats against *E. tenella* and *E. necatrix*, it is a preferred embodiment of the invention to administer the coccidiostats of Formula I above together with one or more other anticoccidial agents which are highly effective against *E. tenella* and *E. necatrix*. Examples of such other coccidiostats are amprolium, nicarbazin, glycarbylamide, 3,5-dinitrobenzamide and 2 - methyl - 3,5 - dinitrobenzamide. Thus, one of the purposes of this invention is to provide highly active broad spectrum anticoccidial compositions which comprise a compound of Formula I and at least one other anticoccidial agent. In many cases the efficacy of such a combination is greater than would be expected from the activity of either coccidiostat alone.

The compounds of Formula I above may be obtained according to synthetic procedures described in the scientific literature. For example, lower alkyl 4-nitro benzoates having an alkoxy or alkenyloxy radical at the 2-position are produced by esterifying and etherifying 4-nitro-2-hydroxy benzoic acid in one step when the same alkyl group is desired in both the ester and ether, or in two separate reactions when the hydrocarbon radicals in the ester and ether are to be different. The free acid is readily obtained by saponification of an alkyl 4-nitro-2-alkoxy (or alkenyloxy) benzoate. In order to obtain the 2-alkylthio or 2-alkenylthio-4-nitro benzoic acids or esters, it is convenient to alkylate or alkenylate lower alkyl 4-nitro-2-mercapto benzoate, and subsequently hydrolyze the ester if desired, or to alkylate 2-thiocyano-4-nitro benzoic acid.

The following examples are given for the purpose of illustration and not by way of limitation.

EXAMPLE 1

Anticoccidial activity of the compounds of this invention was determined in the following manner:

Straight run White Leghorn chicks, in groups of three each, were weighed and placed in cages with wire floors. They were fed ad libitum a standard laboratory ration in which graded concentrations of test compounds were blended just prior to use. Normal and infected control birds were fed basal ration containing no test compound. On the second day of the test the chicks were inoculated orally with 1,000,000 sporulated oocysts of *Eimeria maxima*. On the sixth day after inoculation all surviving birds were sacrificed and weighed. The small intestines were pooled in water and homogenized in a blender. Two aliquots of the homogenate were examined for oocysts in a hemocytometer. If the total count of oocysts was less than 30, the compound was rated as active.

The activity of representative compounds of the invention is set forth below, the dose level being the minimum level at which the compound was active.

| Compound: | Dose level (percent by weight in feed) |
|---|---|
| 2-methoxy-4-nitro benzoic acid | 0.006 |
| 2-methylthio-4-nitro benzoic acid | 0.003 |
| 2-ethoxy-4-nitro benzoic acid | 0.002 |
| 2-ethylthio-4-nitro benzoic acid | 0.003 |

EXAMPLE 2

*2-methylthio-4-nitro benzoic acid*

18 g. of 2-thiocyano-4-nitro benzoic acid are added to a solution of 22.4 g. of potassium hydroxide in 225 ml. of methanol. 15 ml. of methyl iodide is added, and the mixture heated with gentle refluxing for 12 hours. The hot solution is then filtered, concentrated to about one-half volume, and cooled. Crystals of 2-methylthio-4-nitro benzoic acid form, which are recovered by filtration and recrystallized from methanol, M.P. 216° C.

Any departure from the above description which conforms to the present invention is intended to be included within the scope of the claims.

What is claimed is:

1. The method of controlling coccidiosis in poultry that comprises orally administering to poultry an anticoccidial amount of a 4-nitro benzoic acid compound of the formula

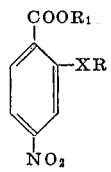

where X is selected from the class consisting of oxygen and sulfur, R is selected from the class consisting of lower alkyl and lower alkenyl, and $R_1$ is a member of the class consisting of hydrogen, a hydrocarbon having less than 8 carbon atoms, an alkali metal and an alkaline earth metal.

2. The method of claim 1 wherein the 4-nitro benzoic acid compound is contained in the poultry feed at a level of about 0.0005 to 0.0125 percent by weight.

3. The method of claim 1 wherein the anticoccidial compound is 2-ethoxy-4-nitro benzoic acid.

4. The method of claim 1 wherein the anticoccidial compound is lower alkyl 2-ethoxy-4-nitro benzoate.

5. An anticoccidial composition that comprises a poultry feedstuff having admixed therein an anticoccidial amount of a compound having the formula

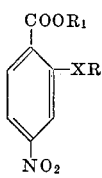

where X is selected from the class consisting of oxygen and sulfur, R is selected from the class consisting of lower alkyl and lower alkenyl, and $R_1$ is a member of the class consisting of hydrogen, a hydrocarbon having less than 8 carbon atoms, an alkali metal and an alkaline earth metal.

6. An anticoccidial composition that comprises a poultry feedstuff having admixed therein from about 0.0005% to about 0.0125% by weight of a compound having the formula

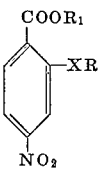

where X is selected from the class consisting of oxygen and sulfur, R is selected from the class consisting of lower alkyl and lower alkenyl, and $R_1$ is a member of the class consisting of hydrogen, a hydrocarbon having less than 8 carbon atoms, an alkali metal and an alkaline earth metal.

7. A poultry feedstuff having dispersed therein from about 0.0005% to about 0.0125% by weight of 2-ethoxy-4-nitro benzoic acid.

8. A poultry feed supplement composition that comprises a solid, nutritive poultry feed additive having dispersed therein from about 1 to 30% by weight of a 4-nitro benzoic acid compound of the formula

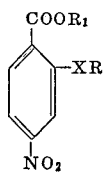

where X is selected from the class consisting of oxygen and sulfur, R is selected from the class consisting of lower alkyl and lower alkenyl, and $R_1$ is a member of the class consisting of hydrogen, a hydrocarbon having less than 8 carbon atoms, an alkali metal and an alkaline earth metal.

9. A poultry feed supplement composition that comprises a solid, nutritive poultry feed additive containing from about 2 to 20% by weight of a 4-nitro benzoic acid compound of the formula

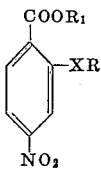

where X is selected from the class consisting of oxygen and sulfur, R is selected from the class consisting of lower alkyl and lower alkenyl, and $R_1$ is a member of the class consisting of hydrogen, a hydrocarbon having less than 8 carbon atoms, an alkali metal and an alkaline earth metal.

References Cited by the Examiner

Vanderhaeghe: Chem. Abst., vol. 47–1953, page 11157d.

JULIAN S. LEVITT, *Primary Examiner.*

FRANK CACCIAPAGLIA, Jr., LEWIS GOTTS,
*Examiners.*